United States Patent
Sandstrom et al.

(10) Patent No.: US 9,621,295 B1
(45) Date of Patent: Apr. 11, 2017

(54) PON OVERLAY ON A LEGACY OPTICAL ACCESS NETWORK

(71) Applicant: Adtran Inc., Huntsville, AL (US)

(72) Inventors: Leif Sandstrom, Huntsville, AL (US);
Darrell Brown, Huntsville, AL (US);
Kevin Gregory Givens, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 246 days.

(21) Appl. No.: 14/086,553

(22) Filed: Nov. 21, 2013

(51) Int. Cl.
*H04J 14/00* (2006.01)
*H04J 14/02* (2006.01)

(52) U.S. Cl.
CPC .................. *H04J 14/023* (2013.01)

(58) Field of Classification Search
CPC .. H04J 14/023; H04J 14/0232; H04J 14/0234; H04J 14/0235; H04J 14/0236; H04J 14/0239; H04J 14/0242; H04J 14/0245; H04J 14/0246; H04J 14/0247; H04J 14/0249; H04J 14/025; H04J 14/0252; H04J 14/0238; H04J 14/0241; H04J 14/0278; H04J 14/0279; H04J 14/0283; H04J 14/0284; H04J 14/0286; H04J 14/0282; H04B 10/27; H04B 10/25753; H04B 10/271; H04B 10/25758; H04B 10/272; H04Q 2011/0047
USPC ................................ 398/72, 71, 67, 70, 66
See application file for complete search history.

(56) References Cited

U.S. PATENT DOCUMENTS

| | | | | |
|---|---|---|---|---|
| 2006/0239683 A1* | 10/2006 | Park | ................... | H04J 14/0226 398/71 |
| 2009/0097845 A1* | 4/2009 | Campbell | ............ | G02B 6/4452 398/17 |
| 2009/0110393 A1* | 4/2009 | Nara | ................... | G02B 6/12007 398/45 |
| 2010/0266284 A1* | 10/2010 | Zhu | ..................... | H04B 10/2503 398/72 |
| 2010/0329680 A1* | 12/2010 | Presi | ................. | H04B 10/2587 398/79 |
| 2012/0106952 A1* | 5/2012 | Xu | ..................... | H04Q 11/0067 398/28 |

* cited by examiner

*Primary Examiner* — M. R. Sedighian
(74) *Attorney, Agent, or Firm* — Fish & Richardson P.C.

(57) ABSTRACT

Methods, systems, and apparatus for overlaying a passive optical network on a legacy optical access network are disclosed. In one aspect a system includes a legacy optical access network in a copper loop plant. The legacy optical access network provides access to customer premises. The system also includes a gigabit passive optical network (GPON) that is overlaid on the legacy optical access network. A fiber is shared by the GPON and the legacy optical access network. The GPON can provide a plurality of channels on the shared fiber at wavelengths that are separate and independent of wavelengths of the legacy optical access network.

18 Claims, 5 Drawing Sheets

PON OVERLAY ON A LEGACY OPTICAL ACCESS NETWORK

BACKGROUND

This specification relates to data transmissions in a telecommunications environment.

Fiber in the loop (FITL) is an optical system that was deployed to extend the reach of copper communications technologies. Generally, FITL systems are implemented by installing a section of optical fiber into existing copper loop plant. The section of fiber can be installed between the copper loop plant and a customer premises.

SUMMARY

In general, one innovative aspect of the subject matter described in this specification can be embodied in systems that include a legacy optical access network in a copper loop plant and providing access to customer premises; a gigabit passive optical network (GPON) overlaid on the legacy optical access network; a fiber shared by the GPON and the legacy optical access network; and the GPON including a plurality of channels on the shared fiber at wavelengths that are separate and independent of wavelengths of the legacy optical access network. Other embodiments of this aspect include corresponding devices and methods.

These and other embodiments can each optionally include one or more of the following features. The GPON can be configured to transmit upstream GPON transmissions on a carrier wavelength that is separated from downstream GPON transmissions by at least 20 nm. The legacy optical access network comprises a fiber-in-the-loop (FITL) network. The FITL network can include plain old telephone service (POTS) and digital subscriber line (DSL) to customer premises. The GPON can be configured to operate using wavelengths within 10 nm of 1610 nm and within 10 nm of 1550 nm.

Another innovative aspect of the subject matter described in this specification can be embodied in systems that include a legacy optical access network communicating between customer premises and a copper loop plant; a gigabit passive optical network (GPON) overlaid on the legacy optical access network; a fiber shared by the GPON and the legacy optical access network; and a high isolation and low loss filter coupled to the shared fiber to multiplex/demultiplex downstream GPON channels from legacy channels. Other embodiments of this aspect include corresponding devices and methods.

These and other embodiments can each optionally include one or more of the following features. The GPON can be configured to transmit upstream GPON transmissions on a carrier wavelength that is separated from downstream GPON transmissions by at least 20 nm. The legacy optical access network can include a fiber-in-the-loop (FITL) network. The FITL network can be configured to operate with a 4 dB link loss budget. The FITL network can be configured to provide plain old telephone service (POTS) and digital subscriber line (DSL) service to customer premises.

The FITL network can have an output transmit power of at least −30 dBm. The FITL network can include a FITL transceiver that is configured to recover communications having a power of at least −34 dBm. The FITL network can be configured as a dual wavelength communications system. The FITL network can include FITL transceivers that are configured to operate using carrier wavelengths of 1310 nm and 1490 nm.

The legacy optical access network can be an Asynchronous Transfer Mode Passive Optical Network (APON). The legacy optical access network can be a Broadband Passive Optical Network (BPON). The GPON can include transceivers that are configured to operate using wavelengths within 10 nm of 1610 nm and within 10 nm of 1550 nm.

Another innovative aspect of the subject matter described in this specification can be embodied in devices that include a demultiplexer coupled to an optical access fiber shared by a fiber-in-the-loop (FITL) network and a gigabit passive optical network (GPON); the demultiplexer operable to demultiplex a plurality of GPON channels from one or more FITL channels; and the demultiplexer can include a WDM filter providing an isolation of at least 27 dB and a loss less than 0.75 dB including connector loss. Other embodiments of this aspect include corresponding systems and methods.

Another innovative aspect of the subject matter described in this specification can be embodied in devices that include a demultiplexer coupled to an optical access fiber shared by a legacy optical access network and a gigabit passive optical network (GPON); the demultiplexer operable to demultiplex a plurality of GPON channels from one or more legacy optical access network channels; and the demultiplexer can include a WDM filter providing an isolation of at least 27 dB and a loss less than 0.75 dB including connector losses. Other embodiments of this aspect include corresponding systems and methods.

Another innovative aspect of the subject matter described in this specification can be embodied in methods that include the actions of connecting a WDM filter to a fiber link of a legacy optical access network ("legacy network"); connecting a GPON transceiver and a legacy network transceiver to the WDM filter; transmitting GPON downstream communications to the WDM filter; transmitting legacy network downstream communications to the WDM filter; and combining the GPON downstream communications and the legacy network downstream communications onto a shared fiber link. Other embodiments of this aspect include corresponding systems and devices.

These and other embodiments can each optionally include one or more of the following features. Methods can include the operations of connecting a second WDM filter to the fiber link; connecting a second GPON transceiver and a second legacy network transceiver to the second WDM filter; combining, by the second WDM filter and onto the shared fiber link, upstream transmissions that are received at the second WDM filter.

Particular embodiments of the subject matter described in this specification can be implemented so as to realize one or more of the following advantages. Services that require more bandwidth than that provided by a legacy optical access network can be deployed by overlaying a higher bandwidth optical network on the legacy optical access network. Existing fiber infrastructure can be used to deploy a gigabit optical network (GPON) because a legacy optical access network (e.g., a FITL network) and a gigabit passive optical network (GPON) can both communicate over a shared fiber link in the legacy optical access network.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

As demand for network services increases, access network providers are implementing new technologies to provide access network services to more subscribers and/or to provide more services to at least some of the subscribers. Some of these access network providers have existing access networks that they have been using to provide services to subscribers, but the services that can be provided over these legacy access networks may be limited based on the operating characteristics of these legacy access networks. However, access network providers may be able to utilize at least a portion of their legacy access network infrastructure to deploy additional (e.g., higher bandwidth) services.

An example legacy network that has been deployed by some access network providers is a fiber in the loop (FITL) network. As discussed in detail with reference to FIG. 1, a FITL network utilizes a combination of fiber optic cables and twisted pair cables to provide network services (e.g., xDSL services) to subscribers. As discussed throughout this document, an access network provider can use the fiber optic cable of the existing FITL network to provide additional services to subscribers. For example, an access network provider can implement a fiber to the premises network (FTTP) using the fiber optic cable in the existing FITL network, which reduces the cost of deploying the FTTP network because the access network provider avoids the cost of the fiber optic cable that would have been required if the fiber optic cable of the FITL network were not used.

Some example FTTP networks that an access provider can deploy using the existing FITL fiber optic cable are passive optical networks (PONs) and active optical networks (AONs). For example, an access network provider may implement a gigabit passive optical network (GPON) using the existing fiber optic cable that was used to implement the FITL network. The deployment of the GPON (or another optical network) using the same fiber optic cable as FITL network (or another legacy optical access network) is referred to as overlaying the GPON on the FITL network.

In some implementations, a GPON is overlaid on a FITL network in a manner that enables both the GPON Overlay and FITL network to communicate over the fiber optic cable that is in the existing FITL network. Throughout this document, a network in which a GPON is overlaid on a FITL network is referred to as a GOFITL network. Since the GPON Overlay may be implemented on a previously installed FITL network, the FITL can operate at typical FITL wavelengths (e.g., 1490 nm downstream and 1310 nm upstream), while the overlaid GPON may be implemented to operate at wavelengths that differ from typical GPON wavelengths (e.g., GPON wavelengths of 1490 nm downstream and 1310 nm upstream). Throughout this document the terms downstream and downstream communications are used to refer to communications transmitted toward the end user, while the terms upstream and upstream communications are used to refer to communications transmitted toward the service provider (e.g., a telecommunications service provider's central office).

When multiple different optical wavelengths are used to communicate over a single shared fiber optic cable, wavelength division multiplexing/demultiplexing can be used to combine the multiple different optical wavelengths onto the shared fiber optic cable and separate the different wavelengths after transmission over the shared fiber optic cable. As discussed in more detail below, WDM filters can be used to perform the multiplexing/demultiplexing, and the optical parameters of the FITL system determine the performance requirements of the WDM filters used to multiplex GPON Overlay and FITL transmissions. For example, FITL networks generally only allow for a relatively small amount of power loss from one end of the FITL optical network to the other end of the FITL optical network (e.g., 4 dB or less). This relatively small acceptable power loss requires that the WDM filters used to multiplex the GPON Overlay onto the FITL optical network have extremely low insertion loss so as not to excessively constrain the FITL loss budget. In addition, the relatively low FITL receive power standards (e.g., −34 dBm in some systems) require that the WDM filters must have enough isolation to attenuate the GPON Overlay signals by at least a specified amount (e.g., more than 50 dB) before they reach the FITL receivers.

Throughout this document example values for wavelengths, power levels, isolation values, and other example characteristics of the GOFITL network are used for purposes of illustration, and are not intended to limit the range of values or characteristics that can be used to implement the GOFITL system.

Figure 1:
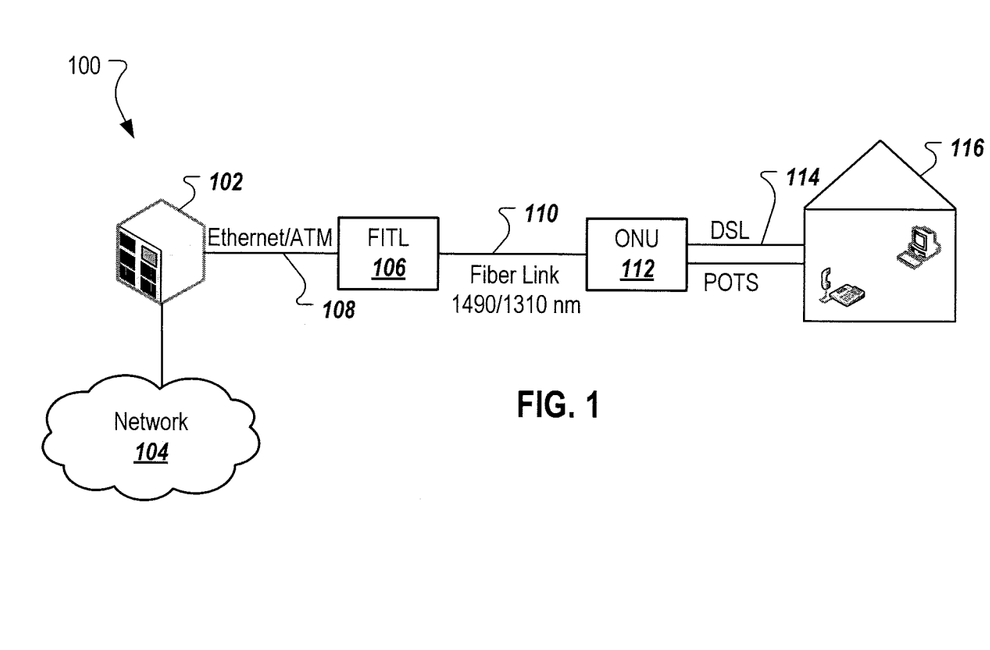
FIG. 1 is a block diagram of an example FITL network.
Figure 3:
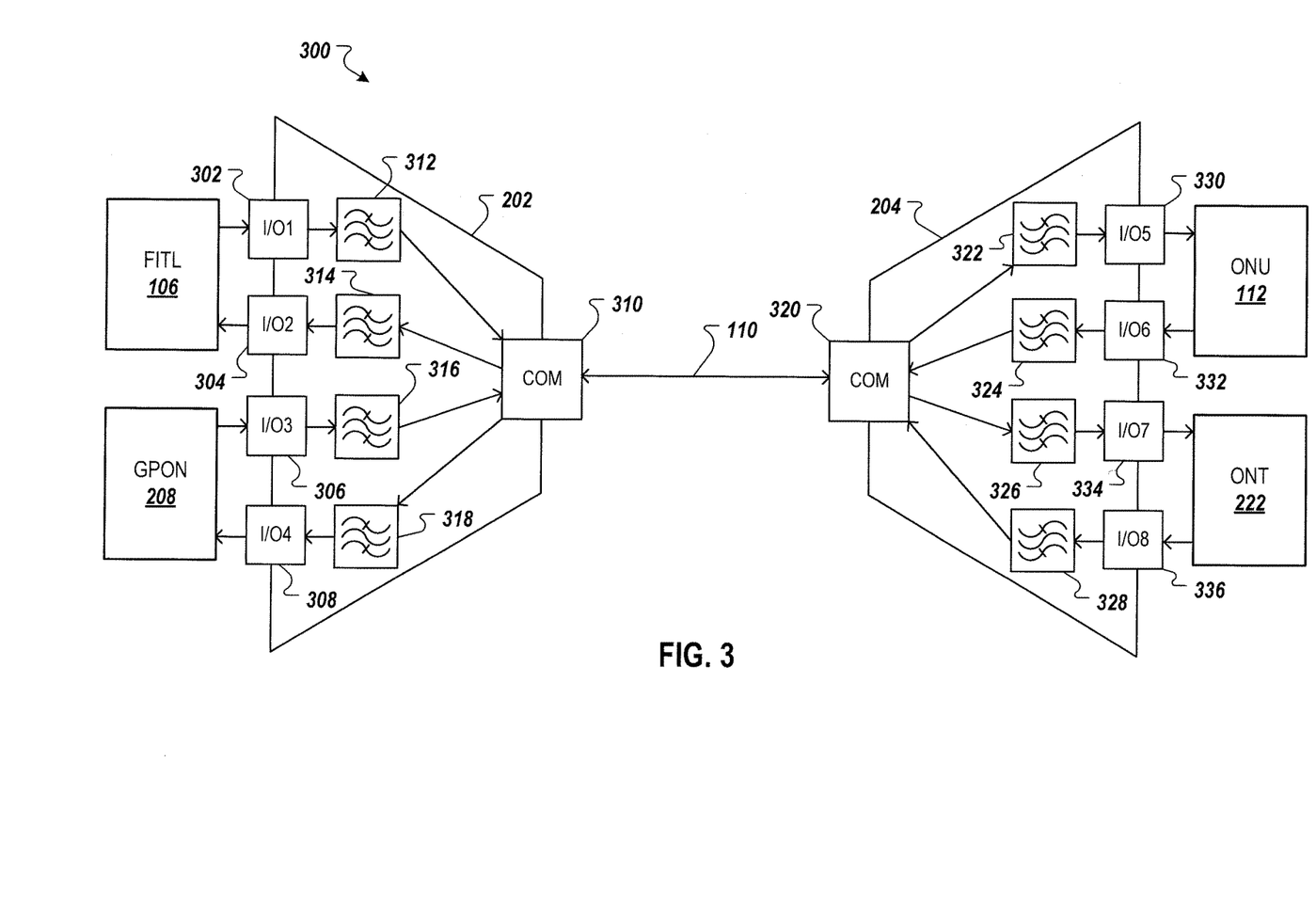
FIG. 3 is a block diagram of another example GOFITL network.
Figure 4:
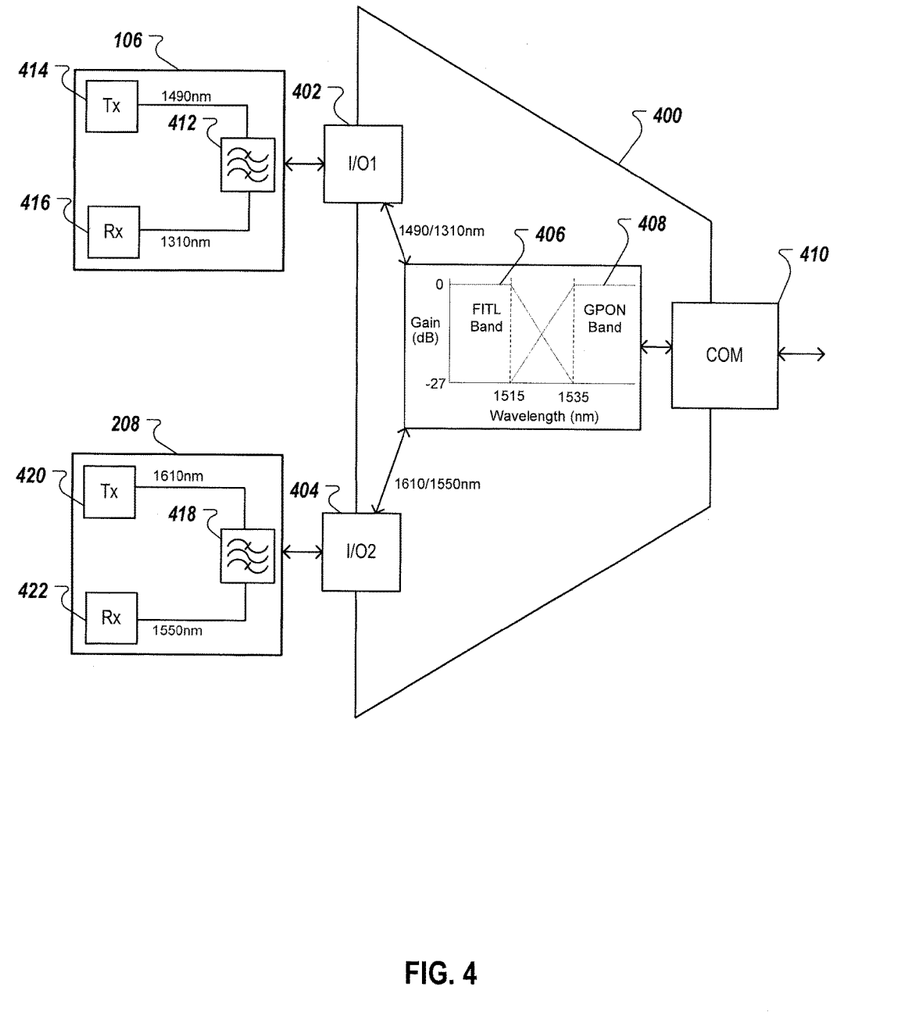
FIG. 4 is a block diagram of an example WDM filter that has two passbands.
Figure 5:
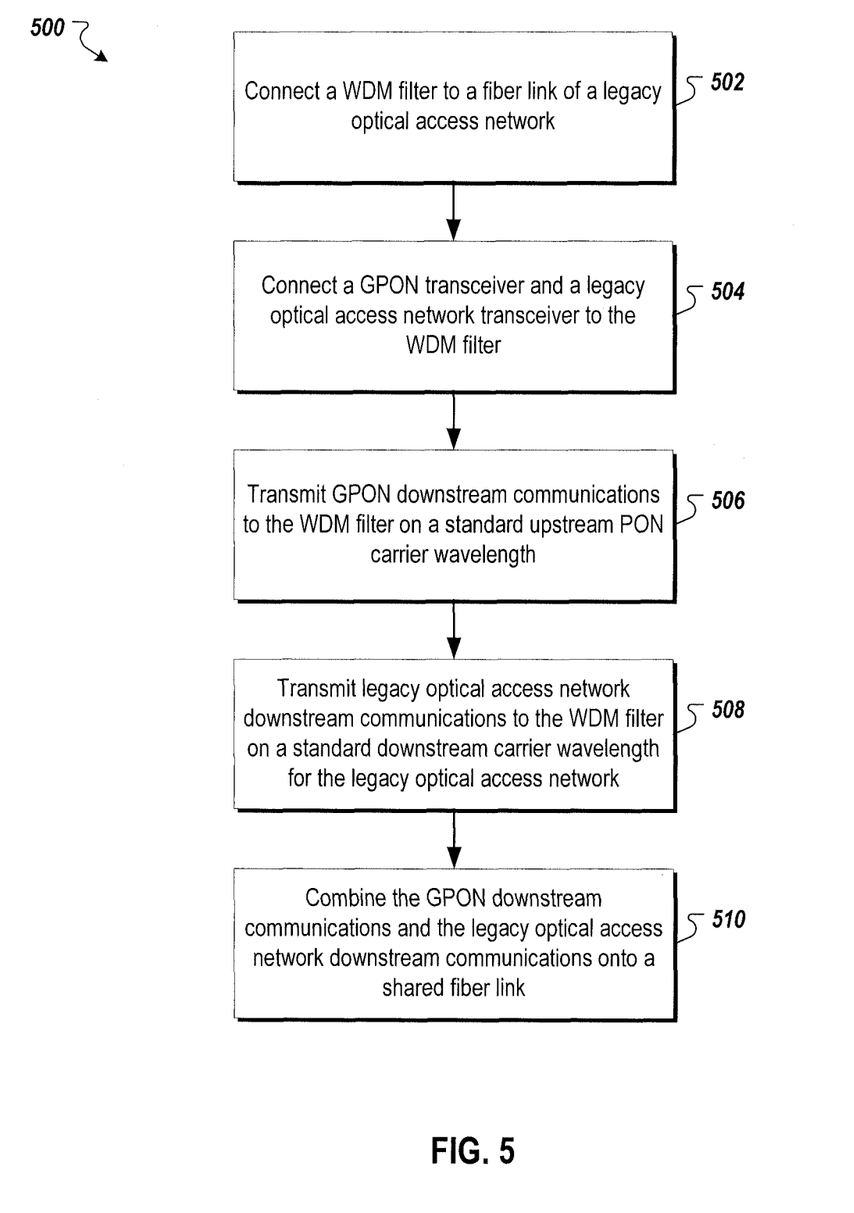
FIG. 5 is a flow chart of an example process for transmitting GPON Overlay communications over a legacy optical access network.

The discussion that follows with reference to FIG. 1 introduces components of an example legacy FITL network that can be used to implement a GOFITL system. The description referencing FIG. 2 relates to an example GOFITL network that can be implemented by overlaying a GPON on the example legacy FITL network of FIG. 1. The descriptions that reference FIGS. 3 and 4 provide details regarding example WDM filters that can be used to implement the GOFITL network of FIG. 2, and the description that references FIG. 5 provides details regarding an example method for overlaying a GPON on a legacy FITL network.

FIG. 1 is a block diagram of an example FITL network 100. In some implementations, the FITL network 100 is an asynchronous transfer mode passive optical network (APON) that is based on the Asynchronous Transfer Mode communications standard. In some implementations, the FITL network is a broadband passive optical network (BPON). The FITL network can be implemented as a gigabit Ethernet point to point FITL network. The FITL network can also be implemented as a coarse wavelength division multiplexed (C WDM) point to point network.

The FITL network 100 includes a router 102 that is connected to a network 104, such as a wide area network or the Internet. The router 102 is coupled to a FITL transceiver 106 by a communications link 108, such as a twisted pair communications link that is typically part of a legacy telecommunications system. The router 102 and the FITL transceiver can communicate using standard communications techniques such as Asynchronous Transfer Mode (ATM) or Ethernet communications.

The FITL transceiver 106 can be an electrical to optical and optical to electrical transceiver that receives electrical communications signals from the router 102 over the communications link 108, and converts the received electrical communications signals to optical communications signals that are then transmitted over a fiber link 110. In many FITL systems, the FITL transceiver 106 converts the electrical communications received from the router 102 to optical communications that are transmitted to an optical networking unit (ONU) 112 over the fiber link 110 at a wavelength of 1490 nm.

The optical networking unit 112 receives the downstream optical communications from the FITL transceiver 106 at an optical input. The ONU 112 includes an optical to electrical and electrical to optical transceiver that converts the optical communications received from the FITL transceiver 106 to electrical communications, and transmits the electrical communications to an end user location 116, such as a user's residence. The end user location 116 can also be referred to as a customer premises.

The electrical communications can be transmitted to the end user location 116, for example, over a twisted pair communications link 114 that is typically included in a legacy telecommunications system. The electrical communications can include both digital subscriber line (DSL) data and plain old telephone service (POTS) data. The DSL data and POTS data can both be transmitted over the same twisted pair communications link 114 since the DSL data is transmitted in higher frequency bands than the POTS data.

The optical networking unit 112 also receives upstream electrical communications (e.g., DSL and POTS data) from the end user location 116, converts the upstream electrical communications to upstream optical communications using the electrical to optical transceiver, and transmits the upstream optical communications to the FITL transceiver 106 over the fiber link 110. In many FITL systems, the upstream communications are transmitted at a wavelength of 1310 nm.

The FITL transceiver 106 receives the upstream optical communications from the ONU 112, converts the upstream optical communications to upstream electrical communications, and transmits the upstream electrical communications to the router 102, which then routes the upstream electrical communications based, for example, on routing information that is included in the upstream electrical communications. The FITL transceiver 106 can encode the upstream electrical communications using ATM, Ethernet, or another communications standard that the router 102 is configured to transmit.

As noted above, the optical parameters of the FITL system determine the performance requirement of the WDM filters used to multiplex GPON Overlay and FITL onto a shared fiber optic cable. For example, FITL networks similar to the example FITL network 100 generally have an optical link loss budget of 4 dB, which means that the power loss from one end of the FITL optical network to the other end of the FITL optical network must be 4 dB or less. This relatively small link loss budget requires that the WDM filters used to multiplex the GPON Overlay onto the FITL optical network have extremely low insertion loss so as not to excessively constrain the FITL loss budget. In addition, the relatively low FITL receive power standards (−34 dBm in some systems) means that the WDM filters must have enough isolation to attenuate the Overlay signals by more than 50 dB before they reach the FITL receivers.

As described in more detail below, a GPON can be overlaid on a legacy FITL network to create a GOFITL network by using modified GPON components. The GOFITL network can enable service providers to utilize the GPON Overlay to provide higher bandwidth services to some end users, while also utilizing the legacy FITL network to continue to provide services to legacy end users. In some implementations, modified GPON communications (i.e., GPON Overlay communications output by the modified GPON components) and FITL communications are both transmitted over a same fiber link, which can be referred to as a shared fiber link, such that existing FITL fiber links (e.g., fiber link 110 in FIG. 1) can be used to transport both the FITL communications and GPON Overlay communications.

Figure 2:
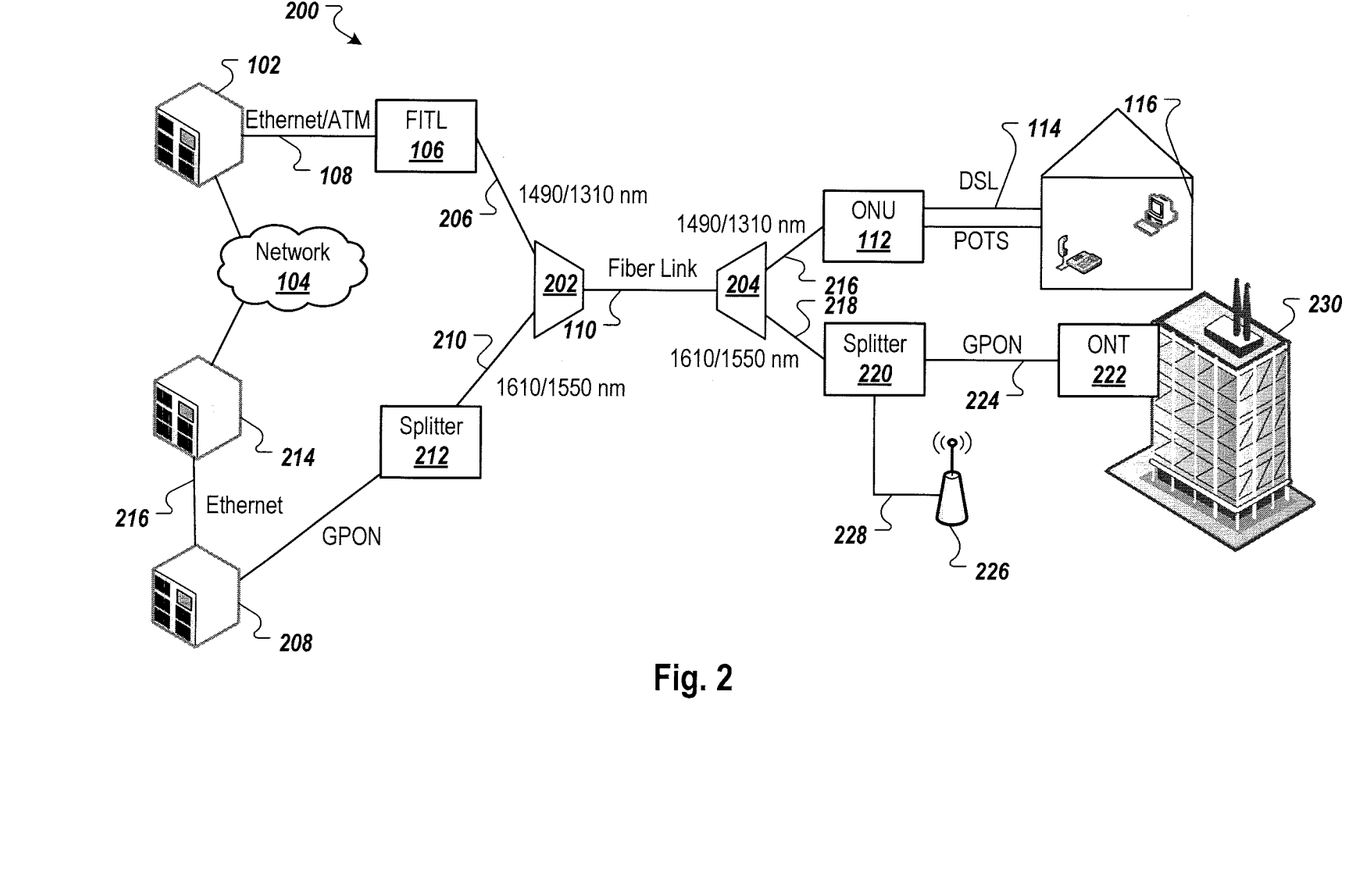
FIG. 2 is a block diagram of an example GOFITL network.

FIG. 2 is a block diagram of an example GOFITL network 200. The GOFITL network 200 is a combination of a GPON Overlay and a FITL network. For example, the GOFITL network 200 includes each element of the FITL network 100 discussed above, but also includes a GPON overlaid on the FITL network 100.

In some implementations, the GPON Overlay and the FITL network each communicate over the same fiber link, such as the fiber link 110 that is part of the existing FITL network described above with respect to FIG. 1. To facilitate simultaneous and/or independent communication over the fiber link 110 by both the FITL network and the GPON Overlay, the GOFITL network 200 can include Wavelength Division Multiplexing (WDM) filters 202 and 204 that are each connected to the fiber link 110. As discussed in more detail below, each of the WDM filters 202 and 204 are configured to multiplex and demultiplex GPON Overlay and FITL network communications while providing sufficient isolation between the FITL network communications and the GPON Overlay communications. Therefore, the FITL network communications and the GPON Overlay communications can both be transmitted over the same fiber link 110.

The WDM filters 202 and 204 can each operate as a multiplexer/demultiplexer that is configured to receive multiple different wavelength optical transmissions, and combine those different wavelength optical transmissions into a multiplexed optical transmission for transmission over a single fiber, such as the fiber link 110. For example, the WDM filter 202 can receive and combine downstream optical transmissions from the FITL transceiver 106 over an optical link 206 with optical transmissions from a GPON Overlay transceiver 208 that are received either directly over another optical link 210, or optionally from an optical splitter 212 that is connected between the GPON Overlay transceiver 208 and the WDM filter 202. The splitter 212 is configured to provide the GPON Overlay communications to multiple different WDM multiplexers (and/or other GPON optical links), such that the GPON Overlay communications can be overlaid on multiple different FITL networks.

In some implementations, each WDM filter 202 and 204 functions as a demultiplexer that is configured to receive a multiplexed optical transmission, and separate the multiple different wavelength optical transmissions that were used to create the multiplexed optical transmission. For example, the WDM filter 204 is connected to the WDM filter 202 by the fiber link 110. The WDM filter 204 is configured to receive multiplexed optical transmissions from the WDM filter 202, and separate the multiple different wavelengths that the WDM 202 used to create a downstream multiplexed optical transmission. This document refers to the WDM filters 202 and 204 as being connected to the fiber link 110 of the FITL network, but any WDM multiplexer and demultiplexer can be coupled to the fiber link 110 of the legacy FITL network.

Example operating characteristics of the WDM filters 202 and 204 are discussed in detail below, but generally the WDM filters can be implemented using any one of many appropriate techniques. For example, the WDM filters can be implemented using thin film filters (TFFs), ring resonators, fiber Bragg gratings, diffraction based techniques such as arrayed waveguide gratings, etc. The WDM filter 204 (e.g., the downstream demultiplexer) can separate and isolate the various wavelengths that were used by the WDM filter 202 to create the downstream multiplexed optical transmission. The WDM filter 204 can then output the various wavelengths onto various fiber links.

For example, as illustrated by FIG. 2, the WDM filter 204 can be a high isolation low insertion loss optical filter having a FITL passband (e.g., a passband for wavelengths up to 1515 nm) and a GPON Overlay passband (e.g., a passband for wavelengths greater than 1535 nm). The FITL passband of the WDM filter 204 allows the 1490 nm downstream optical transmissions of the FITL network to pass through the WDM filter, and the WDM filter 204 directs the 1490 nm downstream optical transmissions onto an optical link 216 that is connected to the ONU 112. As described above, the ONU 112 converts the 1490 nm downstream optical transmissions into electrical signals that are then provided to the end user location 116 and/or other end user locations.

Continuing with the example illustrated by FIG. 2, the GPON Overlay passband of the WDM filter 204 allows the 1610 nm downstream optical transmissions of the GPON Overlay to pass through the WDM filter 204, and the WDM filter 204 directs the 1610 nm downstream optical transmissions onto an optical link 218 that is connected to a splitter 220. The splitter 220 is configured to provide the 1610 nm downstream optical transmissions to multiple different devices. For example, the splitter 220 can have one port connected to an optical network terminal (ONT) 222 by one fiber link 224, and have another port connected to a wireless access point 226 by another fiber link 228. The wireless access point 226 may be configured to provide wireless access for a set of telecommunications customers that subscribe to a particular level of services, and the ONT 222 may be configured to provide telecommunications services to an entity 230, such as a business enterprise. Alternately, the optical link 218 may connect directly to any of the aforementioned termination devices 222, 226.

The transmission of upstream communications in the GOFITL network 200 is achieved in a manner similar to that described above, but will be performed using different upstream wavelengths, and the upstream communications will generally originate from user devices (e.g., devices connected to the ONU, ONT, or wireless access point) rather than the network 104 or telecommunications central office. For example, the ONU 112, ONT 222, and/or wireless access point 226 can each be configured to receive upstream communications from end user devices and encode those upstream communications for transmission over the fiber link 110.

To reduce interference between the GPON Overlay and FITL networks that are implemented in the GOFITL network 200, the wavelengths that are used for the GPON Overlay in the GOFITL network 200 differ from those of a typical GPON. In some implementations, the GPON Overlay of the GOFITL network utilizes a typical PON upstream transmission wavelength for downstream transmissions, while utilizing a typical PON downstream transmission wavelength for upstream transmissions.

For example, the GPON Overlay transceiver 208 can be configured to have a downstream transmitter that operates at a typical PON upstream wavelength and an upstream receiver that operates at a typical PON downstream wavelength. In a particular example, the GPON Overlay transceiver 208 can have a transmit laser that outputs a 1610 nm (+/−10 nm) carrier wavelength, and can have a receiver that is configured to receive and decode data encoded on a 1550 nm (+/−10 nm) carrier wavelength.

Similarly, the ONT 222 can be configured to have a downstream receiver that operates at the typical PON upstream wavelength and an upstream transmitter that operates at a typical PON downstream wavelength. In a particular example, the ONT 222 can have a receiver that is configured to receive and decode data that is encoded on a 1610 nm (+/−10 nm) carrier wavelength, and can have a transmit laser that outputs a 1550 nm (+/−10 nm) carrier wavelength.

The wavelengths used to implement the overlaid GPON of the GOFITL network 200 can vary from those provided above. As noted above, the performance requirements of the WDM filters that are used to overlay the GPON on the FITL network will be based, at least in part, on the optical parameters of the FITL system. As discussed in detail below, the WDM filters 202 and 204 can be required to be high isolation/low insertion loss filters so that the GPON can be overlaid onto the FITL network within the constraints of the FITL link loss budget (e.g., 4 dB) and so that the GPON Overlay signals are attenuated at least a specified amount (e.g., 50 dB) before they reach the FITL receivers.

In some implementations, the WDM filters 202 and 204 can be required to have less than a threshold amount of insertion loss, which can be based in part on the link loss budget of the FITL network. As discussed above, the FITL network 100 generally has a link loss budget of 4 dB, and the GOFITL network 200 should be implemented to meet this FITL link loss budget. The FITL link loss budget can be met, for example, by using WDM filters 202 and 204 that have an insertion loss that is less than or equal to 0.75 dB including WDM connector losses. If connector losses are eliminated by, for example, splicing the WDM filter(s) into the network, loss per filter can be <0.4 dB. For example, assume that based on the loss characteristics of the GOFITL network 200, the combined threshold insertion loss for the WDM filters 202 and 204 in the GOFITL network 200 is 1.5 dB (e.g., based on a total link loss budget of 4 dB for the FITL network and the loss characteristics of other components in the FITL network). In this example, the combined insertion loss of the WDM filters 202 and 204 should not exceed 1.5 dB. Therefore, each of the WDM filters 202 and 204 could have an individual insertion loss threshold of 0.75 dB.

The GOFITL network 200 can be required to provide at least a threshold amount of isolation between the FITL and GPON Overlay transmissions and also be required to provide at least a threshold amount of isolation between the upstream and downstream GPON Overlay transmissions at each end of the GPON Overlay. Thus, the WDM filters 202 and 204 that are used to implement the GOFITL network 200 should provide at least these threshold amounts of isolation, while also having less than the threshold insertion loss. WDM filters (or other filters) that satisfy these isolation and insertion loss requirements are referred to as high isolation and low loss WDM filters.

The amount of isolation that the WDM filters 202 and 204 must provide to prevent the GPON Overlay transmissions from interfering with the FITL transmissions can be determined based on the characteristics of the GOFITL network 200. For example, assume that at the ONU 112, the GPON Overlay transmissions must be at least 15 dB lower than the FITL transmissions in order for the ONU 112 to recover the FITL communications without interference from the GPON Overlay transmissions. In this example, the GPON Overlay transmissions that are present at the ONU 112 should not be greater than −49 dBm (i.e., assuming a −30 dB FITL transmit power, a 4 dB FITL link loss budget, and a 15 dB difference in power between the GPON Overlay transmissions and the FITL transmissions as discussed above).

In some implementations, the amount of isolation that should be provided by the WDM filters can be computed, for example, using relationship (1).

$$\text{Isolation}_{wdm} = P_{gpon1} - P_{gpon2} \quad (1)$$

where, $\text{Isolation}_{wdm}$ is the isolation required to be provided by the WDM filters;

$P_{gpon1}$ is the power of the GPON Overlay transmission at the FITL receiver without the filters; and $P_{gpon2}$ is the power of the GPON Overlay transmissions at the FITL receiver with the filters.

In the present example, $P_{gpon1}$ can be determined based on the output power of the GPON Overlay transmitter, which can be +5 dBm, and the loss across the GOFITL network 200 (ignoring the filter loss). In the present example, the loss associated with the splitter 212 can be 7 dB (assuming a 1:4 splitter), and the loss associated with the fiber link 110 can be 0.75 dB (@ 1610 nm). Thus, in this example, $P_{gpon1}$ can be determined to be −2.75 dBm.

$P_{gpon2}$ can be determined based on the minimum power difference that should exist between the GPON Overlay transmissions and the FITL transmissions (e.g., 15 dBm) and the minimum receive power of the FITL network, which is −34 dBm (i.e., −30 dBm transmit power −4 dBm link loss). Thus, $P_{gpon2}$ is −49 dBm in the present example. According to relationship (1), the total required is 46.25 dB, such that each of the WDM filters 202 and 204 should provide at least 23.13 dB of isolation. If the GOFITL network 200 is implemented without the splitter 212, the WDM filters 202 and 204 can each be required to provide at least 26.63 dB of isolation since the loss across the GOFITL network will decrease by 7 dBm.

The above discussion refers to the isolation that the WDM filters 202 and 204 should provide to ensure that the GPON Overlay power at the ONU 112 is less than a threshold amount. A similar computation can be performed to determine the amount of isolation that the WDM filters should provide to ensure that the GPON Overlay power at the FITL transceiver 106 is less than the threshold amount (e.g., −49 dBm). For purposes of example, assume that the splitter 220 is a 1:8 splitter rather than a 1:4 splitter as discussed above, and that the splitter 220 is associated with a loss of 10.5 dBm instead of the 7 dBm loss that is associated with the 1:4 splitter. Also assume that the loss associated with the fiber link 110 is 0.6 dBm at 1550 nm (the upstream GPON Overlay wavelength for the GOFITL network 200), whereas the loss at 1610 nm is 0.75 dBm. In this example, the isolation required if the splitter 220 is used is 42.9 dB and the isolation required if the splitter 220 is not used is 53.4 dB. Since the GOFITL network 200 can be implemented without the splitter 220, the WDM filters 202 and 204 can be configured to provide the higher level of isolation together (i.e., a total of 53.4 dB isolation) so that a sufficient amount of isolation is provided in networks that utilize the splitter 220 as well as networks that do not utilize the splitter 220. Thus, each of the WDM filters 202 and 204 can be configured to provide at least 26.7 dB of isolation, which, together, will provide at least the total amount of required isolation (e.g., 53.4 dB).

Some WDM filters 202 and 204 that provide sufficient isolation (e.g., 27 dB of isolation) and have less than the threshold amount of insertion loss (e.g., 0.75 dB of insertion loss, including connector loss) may require the transmissions to have pre-determined wavelength separation. For example, WDM filters that provide a specified isolation of more narrowly separated wavelengths may be more expensive and/or more difficult to manufacture than WDM filters that require greater wavelength separation in order to provide the specified isolation.

In some implementations, the WDM filters are configured to provide at least 27 dB of isolation between the FITL and GPON Overlay transmissions and have less than 0.75 dB of insertion loss when there is at least a pre-determined separation between the FITL wavelength and a particular (e.g., a minimum) GPON Overlay wavelength. In a particular example, the WDM filters 202 and 204 that have less than 0.75 dB of insertion loss (including connector loss) may provide at least 27 dB of isolation when there is at least 20 nm of separation between the minimum GPON Overlay wavelength and the maximum FITL wavelength. Therefore, the wavelengths of the GPON Overlay in the GOFITL network 200 can be selected to provide at least 20 nm of separation between the minimum GPON Overlay wavelength and the maximum FITL wavelength. Note that the required isolation may be provided by some WDM filters when the separation is less than 20 nm.

As discussed above, the downstream FITL wavelength can be 1490 nm, but this wavelength can vary, at least in part, based on operating conditions. For example, at high temperatures this wavelength may reach 1510 nm. Additionally, the GPON Overlay wavelength may also vary by +/−10 nm based, at least in part, on operating conditions. In this example, the 20 nm separation between the minimum GPON Overlay wavelength and the maximum FITL wavelength can be achieved by setting the upstream GPON Overlay wavelength to 1550 nm. That is, even if the FITL wavelength reaches 1510 nm, the GPON Overlay upstream wavelength varies by −10 nm to 1540 nm, and each WDM passband provides 5 nm of extra space (e.g., extending the FITL band to 1515 nm and the GPON Overlay band to 1535 nm) to accommodate for excessively harsh or unexpected conditions, there will still be 20 nm of separation between the maximum FITL wavelength and the minimum GPON Overlay wavelength.

In some implementations, a minimum separation between the downstream and upstream GPON Overlay transmissions may be maintained to facilitate GPON Overlay communications. For example, depending on the characteristics of the lasers used in the GPON Overlay components (e.g., the transmitters in the GPON Overlay transceiver 208 and/or the ONT 222), the separation between the upstream and downstream GPON Overlay wavelengths may need to be between 20 nm and 60 nm in order to provide the threshold amount of isolation (e.g., 45 dB of isolation) between the upstream and downstream transmissions. For example, the required separation between the upstream and downstream communications will generally be lower for GPON Overlay components having more stable laser wavelengths than GPON Overlay components having less stable wavelength variations. In a particular example, if the lasers used in the GPON Overlay components have higher variations in response to changes in operating conditions (e.g., changes in ambient temperatures), there will need to be higher separation between the upstream and downstream communications than would be required if more stable lasers (e.g., lasers that vary less in response to changes in operating conditions) were used in the GPON Overlay components.

In some implementations, the downstream GPON Overlay of the GOFITL network 200 is configured to operate at 1610 nm. For example, the lasers used to transmit the downstream GPON Overlay communications over the fiber links (e.g., fiber links 210, 110, 218, 228 and/or 224) can be configured to transmit the GPON Overlay communications on a 1610 nm (+/−10 nm) carrier wavelength. Even if the GPON Overlay downstream wavelength varies by −10 nm to 1600 nm, and the GPON Overlay upstream wavelength varies by +10 nm to 1560 nm, there will still be 40 nm of separation between the downstream and upstream wavelengths, enough separation to provide the threshold amount of isolation. FIG. 3 is a block diagram of another example GOFITL network 300. The GOFITL network 300 includes a FITL transceiver 106, a GPON Overlay transceiver 208, an ONU 112, and an ONT 222 similar to those described above with reference to FIGS. 1 and 2. As discussed above, two WDM filters 202 and 204 can facilitate communication between the FITL transceiver and the ONU 112, and also facilitate communication between the GPON Overlay transceiver 208 and the ONT 222 over a single shared fiber 110. Note that FIG. 3 shows an example implementation in which the incoming transmissions are filtered using filters that are arranged in parallel, but other component topologies can be used (e.g., serially arranged filtering stages).

In some implementations, the WDM filter 202 includes multiple I/O ports that are connected to the FITL transceiver 106 and the GPON Overlay transceiver 208. For example, the WDM filter 202 can have four I/O ports 302, 304, 306, and 308 that are each connected to the FITL transceiver 106 or the GPON Overlay transceiver 208. For purposes of discussion, two I/O ports are shown for the FITL transceiver and the GPON Overlay transceiver 208, but in some implementations as discussed with reference to FIG. 4, only a single I/O port (and single fiber link) is used to facilitate communications between the FITL transceiver 106 and the WDM filter 202, and only a single I/O port (and a single fiber link) is used to facilitate communications between the GPON Overlay transceiver 208 and the WDM filter 202.

As illustrated by FIG. 3, a transmitter of the FITL transceiver 106 may be connected to the I/O port 302 (also labeled I/O1), and a receiver of the FITL transceiver 106 may be connected to the I/O port 304 (also labeled I/O2). Similarly, a transmitter of the GPON Overlay transceiver 208 may be connected to the I/O port 306, and a receiver of the GPON Overlay transceiver 208 may be connected to the I/O port 308 of the WDM filter 202. The connections between the various I/O ports of the WDM filters 202 and 204 are provided for purposes of example only, and the connections between the specific I/O ports and various component transmitters and receivers can vary.

In the present example, the FITL transceiver 106 can transmit FITL communications to the I/O port 302 of the WDM filter 202, and receive FITL communications from I/O port 304 of the WDM filter 202. In some implementations, the transmitter of the FITL transceiver 106 is configured to transmit downstream FITL communications to the I/O port 302 on a typical FITL downstream carrier wavelength (e.g., 1490 nm), and the receiver of the FITL transceiver 106 is configured to receive upstream FITL communications from the I/O port 304 on a typical FITL upstream wavelength (e.g., 1310 nm).

In the present example, the GPON Overlay transceiver 208 can transmit GPON Overlay communications to the I/O port 306, and receive GPON Overlay communications from the I/O port 308. In some implementations, the transmitter of the GPON Overlay transceiver 208 is configured to transmit downstream GPON Overlay communications to the I/O port 306 on a typical PON upstream carrier wavelength (e.g., 1610 nm), and the receiver of the GPON Overlay transceiver 208 is configured to receive upstream GPON Overlay communications from the I/O port 308 on a typical GPON downstream wavelength (e.g., 1550 nm).

As discussed above with respect to FIG. 2, the WDM filter 202 is configured to receive FITL communications and GPON Overlay communications and combine the FITL and GPON Overlay communications for transmission together over a shared fiber link 110. The WDM filter 202 is configured to selectively pass optical wavelengths that are used as carrier wavelengths for the FITL communications and the GPON Overlay communications to the I/O ports 302, 304, 306, and 308, and a common port 310 that is connected to the shared fiber 110.

In some implementations, the WDM filter 202 can include four filters 312, 314, 316, and 318, each of which is configured to have a corresponding passband in order to direct carrier wavelengths that are within the corresponding passband between a particular I/O port and the common port 310. As used in this document, the term passband refers to a band of wavelengths that are directed to a particular port by a filter. In some implementations, a filter can direct transmissions in the band of wavelengths to the particular port, for example, by allowing transmissions in the band of wavelengths to pass through the filter to the particular port, while blocking, reflecting, or otherwise preventing transmissions that are outside of the band of wavelengths from passing through the filter to the particular port. In some implementations, a filter can direct transmissions in the band of wavelengths to the particular port by blocking or reflecting transmissions in the band of wavelengths in a manner that directs those transmissions to the particular port while allowing transmissions that are not in the band of wavelengths to pass through the filter (e.g., to a different port and/or another filter).

The filter 312 of FIG. 3 can be configured to receive a typical downstream FITL carrier wavelength (e.g., 1490 nm) from the I/O port 302, and direct that typical FITL carrier wavelength to the common port 310 for transmission over the shared fiber link 110. In this example, the filter 314 can be configured to receive a typical upstream FITL carrier wavelength (e.g., 1310 nm) from the common port 310 and direct that typical upstream FITL carrier wavelength to the I/O port 304, where it can be passed to the receiver of the FITL transceiver 106.

Similarly, the filter 316 can be configured to receive a typical upstream GPON carrier wavelength (e.g., 1610 nm) and direct that typical upstream PON carrier wavelength to the common port 310 for downstream transmission over the shared fiber link 110. Continuing with this example, the filter 318 can be configured to receive a typical downstream GPON carrier wavelength (e.g., 1550 nm) and direct that typical downstream GPON carrier wavelength to the I/O port 308, where it can be passed, as upstream communications, to the receiver of the GPON Overlay transceiver 208.

The carrier wavelengths that are directed to the common port 310 by the filter 312 and the filter 316 are carried over the shared fiber 110, which is connected to the common port 310 and a common port 320 of the WDM filter 204. The WDM filter 204 has a similar configuration as the WDM filter 202, in that the WDM filter has a common port 320 that is connected to the shared fiber 110, four filters 322, 324, 326, and 328, and four I/O ports 330, 332, 334, and 336. As illustrated by FIG. 3, the I/O port 330 can be connected to a receiver of the ONU 112, the I/O port 332 can be connected to a transmitter of the ONU 112, the I/O port 334 can be connected to a receiver of the ONT 222, and the I/O port 336 can be connected to a transmitter of the ONT 222.

The carrier wavelengths that are received at the common port 320 are passed to the filters 322, 324, 326, and 328, which are each configured to selectively direct a particular carrier wavelength (or wavelength band). For example, the filter 322 can be configured direct a typical downstream FITL carrier wavelength, such that the downstream FITL communications that are received at the common port 320 are directed by the filter 322 to the I/O port 330 (also labeled I/O5) and passed to the ONU 112. Similarly, the filter 326 can be configured to direct a typical upstream PON carrier wavelength (e.g., 1610 nm), such that the downstream GPON Overlay communications, which are transmitted on a typical upstream PON carrier wavelength, are directed by the filter 326 to the I/O port 334 (also labeled I/O7) and passed to the ONT 222.

Continuing with this example, the filter 324 connected to I/O port 332 (also labeled I/O6) can be configured to direct a typical FITL upstream carrier wavelength (e.g., 1310 nm) to the common port 320, and as described above, the ONU 112 can be configured to transmit upstream FITL communications on a typical FITL upstream carrier wavelength. In this example, the transmitter of the ONU 112 is connected to the I/O port 332 and the filter 324 is configured to receive the typical FITL upstream carrier wavelength from the I/O port 332. Since the filter is configured to direct the typical FITL wavelength to the common port 320, the upstream FITL communications that are received from the ONU 112 at the I/O port 332 will be passed to the common port 320.

In some implementations, the filter 328 is configured to direct a typical GPON downstream carrier wavelength (e.g., 1550 nm), and as described above, the ONT 222 can be configured to transmit upstream GPON Overlay communications on the typical GPON downstream carrier wavelength. As illustrated by FIG. 3, the transmitter of the ONT 222 is connected to the I/O port 336 (also labeled I/O8), and the filter is configured to receive the typical GPON downstream wavelength from the I/O port 336. Therefore, the upstream GPON Overlay communications, which are transmitted on a typical downstream GPON wavelength, received from the ONT 222 at the I/O port 336 will be received by the filter 328 and directed to the common port 320.

In the discussion above, the filters 202 and 204 have four passbands, and each passband directs a particular band of wavelengths between one of the four I/O ports and a common port. In some implementations, a portion of the GPON Overlay filtering can be performed by the GPON Overlay transceiver 208 and FITL transceiver 106, thereby reducing the number of passbands in the filters 202 and 204. For example, the WDM filters 202 and 204 of the GOFITL network 200 can each be implemented using a two passband filter, for example a FITL passband and a GPON Overlay passband, as described below with reference to FIG. 4.

FIG. 4 is a block diagram of an example WDM filter 400 that has two passbands 406 and 408. The WDM filter 400 can be used to implement the WDM filters 202 and 204 of FIG. 2. As illustrated, the passband 406 is a FITL passband and the passband 408 is a GPON Overlay passband. The FITL passband 406 enables the WDM filter 400 to direct downstream transmissions in the FITL wavelength band (e.g., less than 1515 nm) to the common port 410 for transmission over a fiber optic link, and enables the WDM filter 400 to direct upstream transmissions in the FITL wavelength band (e.g., less than 1515 nm) to the I/O port 402. Similarly, the GPON Overlay passband 408 enables the WDM filter to direct downstream transmissions in the GPON Overlay wavelength band (e.g., greater than 1535 nm) to the common port 410 for transmission over the fiber optic link, and enables the WDM filter 400 to direct upstream GPON Overlay transmissions in the GPON Overlay wavelength band (e.g., greater than 1535 nm) to the I/O port 404.

The I/O ports 402 and 404 are respectively connected to the FITL transceiver 106 and the GPON Overlay transceiver 208. The I/O port 402 can be connected to the FITL transceiver 106 by a single fiber cable to facilitate upstream and downstream FITL communications between the FITL transceiver 106 and the WDM filter 400. Similarly, the I/O port 404 can be connected to the GPON Overlay transceiver 208 by a single fiber cable to facilitate upstream and downstream communications between the GPON Overlay transceiver 208 and the WDM filter 400.

In some implementations, the FITL transceiver 106 includes a filter 412 that has an upstream passband and a downstream passband. The upstream passband enables the filter 412 to direct upstream FITL transmissions received from the I/O port 402 to the FITL receiver 416. The downstream passband enables the filter 412 to direct downstream FITL transmissions from the FITL transmitter 414 to the I/O port 402. A dual wavelength FITL system is described for purposes of example, but the WDM filter 400 will operate in a manner similar to that described above with a single wavelength FITL system (e.g., a FITL system that transmits both upstream and downstream communications using a 1310 nm carrier).

The GPON Overlay transceiver 208 can similarly include a filter 418 that has an upstream passband and a downstream passband. The downstream passband enables the filter 418 to direct downstream GPON Overlay transmissions received from the GPON Overlay transmitter 420 to the I/O port 404. The upstream passband enables the filter 418 to direct upstream GPON Overlay transmissions received from the I/O port 404 to the GPON Overlay receiver 422. In some implementations, a splitter can be inserted between the GPON Overlay transceiver 208 and the I/O port 404. For example, a splitter similar to splitter 212, described above with reference to FIG. 2 can be inserted between the GPON Overlay transceiver 208 and the I/O port 404, and will function in a manner similar to that discussed above with respect to FIG. 2

Although not illustrated by FIG. 4, the WDM filter 400 can also be used to implement the WDM filter 204. In such implementations, the I/O port 402 would be connected to the ONU 112 of FIG. 2 and the I/O port 404 would be connected to the ONT 222 of FIG. 2 (either directly, or through the splitter 220).

FIG. 5 is a flow chart of an example process 500 for transmitting GPON Overlay communications over a legacy optical access network. The process 500 can be performed, for example, using various devices discussed above with respect to FIGS. 2 and 3.

A WDM filter is connected to a fiber link of a legacy optical access network (502). In some implementations, the legacy optical access network is a FITL network. For example, the legacy optical access network can be a FITL network similar to that described above with reference to FIG. 1. The WDM filter can be connected to, for example, the fiber link 110 in FIG. 1.

In some implementations, multiple WDM filters are connected to the fiber link. For example, as illustrated by FIG. 2, a WDM filter can be connected to both ends of a single fiber link. One of the WDM filters can be configured to operate as a multiplexer for downstream communications, and operate as a demultiplexer for upstream communications. The other WDM filter can be configured to operate as a demultiplexer for downstream communications and operate as a multiplexer for upstream communications.

A GPON Overlay transceiver and a legacy optical access network transceiver ("legacy transceiver") are connected to the WDM filter (504). For example, the GPON Overlay transceiver can be connected to a first I/O port of the WDM filter and the legacy transceiver can be connected to a second I/O port of the WDM filter.

The first I/O port can receive optical transmissions from the GPON Overlay transceiver and pass those optical transmissions to one or more filters that are each configured to direct optical wavelengths in corresponding passbands to a common port of the WDM filter, in a manner similar to that described with reference to FIG. 4. The first I/O port can also pass optical transmissions to the GPON Overlay transceiver in a manner similar to that described above with respect to FIG. 4. The second I/O port can similarly receive optical transmissions from the legacy transceiver and pass optical transmissions to the legacy transceiver.

GPON Overlay downstream communications are transmitted to the WDM filter on a typical upstream PON carrier wavelength (506). As discussed above, the GPON Overlay transceiver is configured to transmit downstream communications on a carrier wavelength that is used for upstream communications in a typical PON. For example, the GPON Overlay downstream communications may be transmitted on a 1610 nm wavelength carrier, which is an upstream carrier for RFOG PON communications.

Legacy optical access network downstream communications are transmitted to the WDM filter on a typical downstream carrier wavelength for the legacy optical access network (508). For example, FITL downstream communications can be transmitted on a typical FITL downstream carrier wavelength, such as 1490 nm.

The GPON Overlay and legacy optical access network communications are combined onto a shared fiber link (510). For example, as discussed above, the WDM filter can combine the downstream communications for transmission over the shared fiber link 110 of FIG. 2.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A system, comprising:
    a legacy optical access network that provides Internet access to a first customer premise at a first data rate;
    a gigabit passive optical network (GPON) overlaid on the legacy optical access network, wherein the GPON is a different network from the legacy optical access network and provides Internet access to a second customer premise at a second data rate higher than the first data rate, wherein a same fiber carries bi-directional communications transmitted over each of the GPON and the legacy optical access network; and
    the GPON comprising a plurality of channels on the same fiber at upstream and downstream wavelengths that are separate and independent of different upstream and downstream wavelengths of the legacy optical access network.

2. The system of claim 1, wherein the GPON is configured to transmit upstream GPON transmissions on a carrier wavelength that is separated from downstream GPON transmissions by at least 20 nm, and wherein the downstream GPON transmissions on the fiber are separated from downstream transmissions of the legacy optical access network by at least 100 nm.

3. The system of claim 1, wherein the legacy optical access network comprises a fiber-in-the-loop (FITL) network.

4. The system of claim 3, wherein the FITL network comprises plain old telephone service (POTS) and digital subscriber line (DSL) to customer premises.

5. The system of claim 1, wherein the GPON is configured to operate using wavelengths within 10 nm of 1610 nm for downstream communications and within 10 nm of 1550 nm for upstream communications.

6. The system of claim 1, wherein the same fiber is connected between a copper loop plant of the legacy optical access network and the first and second customer premises.

7. A system, comprising:
    a legacy optical access network that provides Internet access to a first customer premise at a first data rate;
    a gigabit passive optical network (GPON) overlaid on the legacy optical access network, wherein the GPON is a different network from the legacy optical access network and provides Internet access to a second customer premise at a second data rate higher than the first data rate;
    a same fiber shared by the GPON and the legacy optical access network, wherein the same fiber simultaneously carries bidirectional optical signals for each of the legacy access network and the GPON; and
    a high isolation and low loss filter coupled to the same shared fiber to multiplex/demultiplex downstream GPON channels from legacy channels.

8. The system of claim 7, wherein the GPON is configured to transmit upstream GPON transmissions on a carrier wavelength that is separated from downstream GPON transmissions by at least 20 nm.

9. The system of claim 7, the legacy optical access network comprising a fiber-in-the-loop (FITL) network.

10. The system of claim 9, wherein the FITL network is configured to operate with a 4 dB link loss budget.

11. The system of claim 9, wherein the FITL network comprises plain old telephone service (POTS) and digital subscriber line (DSL) to customer premises.

12. The system of claim 9, wherein the FITL network has an output transmit power of at least −30 dBm.

13. The system of claim 12, wherein the FITL network includes a FITL transceiver that is configured to recover communications having a power of at least −34 dBm.

14. The system of claim 13, wherein the FITL network comprises FITL transceivers that are configured to operate using carrier wavelengths of 1310 nm and 1490 nm.

15. The system of claim 12, wherein the FITL network comprising a dual wavelength communications system.

16. The system of claim 7, wherein the legacy optical access network comprises an Asynchronous Transfer Mode Passive Optical Network (APON).

17. The system of claim 7, wherein the legacy optical access network comprises a Broadband Passive Optical Network (BPON).

18. The system of claim 7, wherein the GPON includes transceivers that are configured to operate using wavelengths within 10 nm of 1610 nm for downstream communications and within 10 nm of 1550 nm for upstream communications.

\* \* \* \* \*

UNITED STATES PATENT AND TRADEMARK OFFICE
CERTIFICATE OF CORRECTION

PATENT NO.        : 9,621,295 B1                                        Page 1 of 1
APPLICATION NO. : 14/086553
DATED             : April 11, 2017
INVENTOR(S)       : Sandstrom et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 335 days.

Signed and Sealed this
Twenty-fifth Day of September, 2018

Andrei Iancu
*Director of the United States Patent and Trademark Office*